United States Patent [19]

Imamura et al.

[11] 4,432,744
[45] Feb. 21, 1984

[54] POWER TRANSMISSION BELT

[75] Inventors: Junji Imamura, Kobe; Kaname Matsumura, Akashi, both of Japan

[73] Assignee: Mitsuboshi Belting Ltd., Kobe, Japan

[21] Appl. No.: 306,403

[22] Filed: Sep. 28, 1981

[30] Foreign Application Priority Data

Sep. 26, 1980 [JP] Japan .................... 55-138014

[51] Int. Cl.$^3$ .................................. F16G 5/00
[52] U.S. Cl. ........................... 474/238; 474/262; 474/267
[58] Field of Search .............. 474/260, 262–266, 474/238; 428/259

[56] References Cited

U.S. PATENT DOCUMENTS

| | | | |
|---|---|---|---|
| 3,416,383 | 12/1968 | Jensen | 474/262 |
| 3,478,613 | 11/1969 | Waugh et al. | 474/262 |
| 3,564,933 | 2/1971 | Clinkenbeard | 474/262 |
| 3,818,741 | 6/1974 | Terhune | 474/262 |
| 3,863,515 | 2/1975 | Meadows | 474/262 |
| 3,871,946 | 3/1975 | Romanski | 428/259 |
| 3,948,113 | 4/1976 | Stork | 474/238 |
| 3,983,761 | 10/1976 | Stewart | 474/260 |
| 3,992,958 | 11/1976 | Bonnefon | 474/238 |
| 4,169,393 | 10/1979 | Wetzel et al. | 474/262 |
| 4,266,937 | 5/1981 | Takano | 474/260 |
| 4,299,587 | 10/1981 | Imamura | 474/262 |
| 4,299,588 | 11/1981 | Standley | 474/264 |
| 4,305,713 | 12/1981 | Imamura | 474/262 |

FOREIGN PATENT DOCUMENTS 2026553  12/1971  Fed. Rep. of Germany ...... 474/264

Primary Examiner—John E. Murtagh
Assistant Examiner—Andrew Joseph Rudy
Attorney, Agent, or Firm—Wood, Dalton, Phillips, Mason & Rowe

[57] ABSTRACT

A power transmission belt (10,21) of improved manufacture wherein a novel reinforcing fabric (4,14) is provided in the inner portion of the compression section (3,13) of the belt. The fabric is formed of yarns (20) having a low coefficient of thermal contraction and a high bias elongation to break. The yarns are formed of a mixture of natural and synthetic resin fibers and are subjected to heat treatment to effect the improved low coefficient of thermal contraction and high bias elongation to break.

32 Claims, 2 Drawing Figures

POWER TRANSMISSION BELT

BACKGROUND OF THE INVENTION

1. Field of the Invention

This invention is concerned with the manufacture of power transmission belts.

2. Description of the Prior Art

In one conventional form of power transmission belt, the belt is defined by an inner compression section, an outer tension section, and intermediate longitudinally extending tensile strength cords. In one form, such a belt defines a V-belt having converging side surfaces. In another form, the belt comprises a multiribbed belt wherein the inner portion of the belt is provided with one or more longitudinally extending notches, or grooves, dividing at least a portion of the compression section into a plurality of side-by-side belt elements adapted to be received in a pulley groove.

In the conventional belts of this type, the compression section and tension section are conventionally formed of rubber or the like. In one form of such a belt as shown in the Jensen et al U.S. Pat. No. 3,416,383, one or more layers of fabric are provided in the compression or tension sections. The fabric layers may be untreated or coated with rubber on one or both sides. The elastomeric layers laminated between the fabric layers may have embedded therein discrete fibers extending transversely to the belt. The fabric layers, as disclosed in Jensen et al, may be stress-relieved by having the warp and weft threads thereof disposed at an angle of between 95° and 155° with each other when viewed in the direction of the longitudinal axis of the belt.

Waugh et al disclose in U.S. Pat. No. 3,478,613, a V-belt which is similar to the belt of Jensen et al discussed above in having one or more layers of fabric disposed in the compression and tension sections.

In U.S. Pat. No. 3,564,933 of Donald E. Clinkenbeard, a banded power transmission belt is disclosed wherein a plurality of rib elements are maintained in spaced side-by-side relationship by interconnecting outer band formed of one or more layers of fabric embedded in an elastomer, with the threads of the fabric being bias laid, i.e. diagonal to the longitudinal extent of the belt.

Delyn M. Stork discloses in U.S. Pat. No. 3,948,113 a multiribbed power transmission belt wherein the band is formed of rubberized woven fabric material, such as cotton, polyester, or nylon, or combinations thereof.

SUMMARY OF THE INVENTION

The present invention comprehends an improved power transmission belt manufacture wherein at least one layer of low thermal contraction fabric is provided in the compression section of the belt.

The invention comprehends the forming of the fabric in a novel manner so as to provide a desired low coefficient of thermal contraction.

The invention further comprehends that the fabric have a bias elongation to break of greater than 60%.

In the illustrated embodiment, the fabric is comprised of yarns formed of a mixture of natural and synthetic fibers in the ratio of approximately 30% to 70%.

The yarns of the fabric may comprise blended yarns, twist-mixed yarns, etc., in providing the desired mixture.

The fabric, in the illustrated embodiment, is rubber-coated.

The fabric may comprise a plain weave fabric or an open weave fabric, as desired.

The fabric, in the illustrated embodiment, is bias-laid in the belt.

One or both of the compression and tension sections may be provided with short transverse reinforcing fibers.

The invention further comprehends the method of forming such an improved power transmission belt structure by heat-treating the fabric suitably to cause the yarns to have a coefficient of thermal contraction of no more than approximately 1%. In the illustrated embodiment, the fabric is heat-treated by subjection thereof to a temperature of approximately 150° C. for an extended period, such as 30 minutes.

In the illustrated embodiments, the natural fibers are formed of cotton, and the synthetic resin fibers are formed of nylon or polyester.

The improved belt manufacture avoids a number of serious disadvantages of the prior art structures discussed above. Thus, where the embedded fabrics are formed primarily of cotton yarn, the belts are contraindicated for use in automobiles and the like which are subject to being splashed with corrosive water from the roadway. Such splashing may cause bacteria to infiltrate the raw edge ends of the cotton fabric fibers with resultant breakage of the fabric layers and failure of the belts in service.

Another problem resulting from the use of cotton fabrics is the relatively high stiffness of the belts, again presenting problems of breakage of the fabrics in use.

By providing the improved belt manufacture wherein the yarns of the fabric have a coefficient of thermal contraction of 1% or less, and a bias elongation of 60% or more, an improved long-life, troublefree belt structure is provided advantageously adapted for rigorous uses as automobile power transmission belts and the like.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
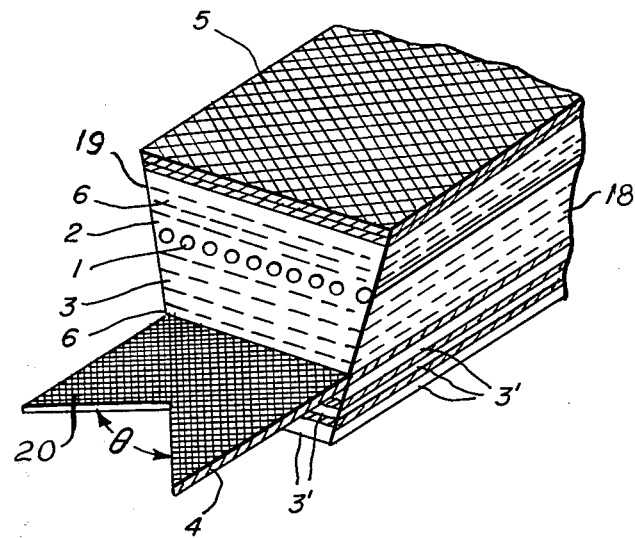
FIG. 1 is a fragmentary perspective sectional view of a belt manufacture embodying the invention.

In the exemplary embodiment of the invention as disclosed in FIG. 1, a V-belt generally designated 10 is shown to comprise a raw edge belt having an inner compression section 3, an outer tension section 2, and tensile cords 1 extending longitudinally of the belt intermediate the compression and tension sections. The compression and tension sections may be formed of conventional rubber material and the tensile cords may be formed of conventional polyester, nylon, aromatic polyamides, such as Kevlar, and the like, as in conventional belt construction.

In the illustrated embodiment, the compression and tension sections may be provided with discrete transversely extending fibers 6 to provide improved lateral stiffness to the belt. The short fibers are provided in the ratio of approximately 0.5% to 30% by weight of the rubber material. The short fibers may be formed of nylon, tetron, vinylon, rayon, or other synthetic resin fibers, as well as inorganic fibers, such as glass fibers and the like. In the illustrated embodiment, the short fibers have a length of approximately 2 to 10 mm.

Also illustrated in the illustrated embodiment is the provision of one or more layers of cover fabric 5 on the outer surface of the tension section 2. The cover fabric may be formed of conventional rubber-coated cotton fabric wherein the warp and weft yarns have a wide angle, such as in the angle between 95° and 150° to each other. Alternatively, the cover fabric may be a fabric comprised of warp yarns of woolie-finished crimped nylon and cotton or nylon weft yarns to define a somewhat more elastic cover fabric. The cover fabrics are preferably rubber-coated and laminated on the bias, as illustrated in FIG. 1, i.e. with the warp and weft yarns thereof extending diagonally to the longitudinal extent of the belt.

The present invention comprehends the provision in the compression section 3 of one or more layers of fabric having low coefficient of thermal contraction as the innermost portion thereof. More specifically, as seen in FIG. 1, in the illustrated embodiment, three such fabric layers 4 are provided to define the inner portion of the compression section 3 of belt 10. Each of the fabric layers is rubber-coated so as to define laminated layers of rubber 3' between the fabric layers. The rubber-coated fabric layers provide enhanced longitudinal elasticity in the belt while at the same time providing improved resistance to corrosion and breakage in such applications as vehicle use applications.

Fabric 4 may comprise alternatively plain woven fabric, i.e. with the warp and weft yarns disposed at an intersection angle of 90°, or open weave fabric, i.e. with the intersection angle between the warp and weft yarns between 95° and 150°. As shown, the fabric is bias-laid in the belt, with the warp and weft yarns extending diagonally to the longitudinal extent of the belt.

As further shown in FIG. 1, the belt is a raw edge belt wherein the ends of the yarns of the fabric 4 are exposed at the side surfaces 18 and 19 of the belt.

In the illustrated embodiment, the yarns 20 making up the fabric 4 are formed of mixtures of natural and synthetic resin fibers. In the illustrated embodiment, the natural fibers are cotton fibers and the synthetic resin fibers comprise nylon or polyester filaments. The cotton fibers are selectively blended or mix-twisted with the synthetic resin filaments in a ratio of approximately 30% to 70%.

The synthetic resin filaments are subjected to a heat elongation treatment at a temperature of approximately 150° to 230° C. at an elongation factor of 2% to 6% so that the filaments have a coefficient of thermal contraction in the range of 1% to 4%. Such fibers without heat elongation treatment may have a coefficient of heat contraction in the range of approximately 3% to 6% and the cotton fibers utilized in the yarns conventionally have a coefficient of thermal contraction in the range of approximately 0% to 1%.

The fabric is subjected to a resorcinal-formaldehyde latex solution to provide a rubber coating thereon, providing improved adhesive strength between the fabric and rubber layers. Following the resorcinal-formaldehyde latex solution treatment, the fabric is subjected to a second heat treatment at a temperature between 150° and 230° C. for one to five minutes and at an elongation factor of −3% to −6% with the fabric in a relaxed state to decrease the coefficient of thermal contraction and increase the elongation.

The treated fabric is left at a temperature of approximately 150° C. for approximately 30 minutes so as to cause the fabric to have a coefficient of thermal contraction of no greater than 1% for both the warp and weft yarns thereof and a bias elongation of at least 60% to 100%, i.e. the elongation to break as a result of a tensile force applied longitudinally of the belt. The commonly used cotton fabric and mixed yarn fabrics of the prior art conventionally have elongations to break in the range of 40% to 60% and, thus, the fabric of the present invention provides a substantially improved strength in this respect.

The indicated range of 30% to 70% mixture ratio of the yarn fibers avoids the relatively low modulus resulting from the use of predominantly cotton fabric and the problem of the melting of the fiber as by heating during use of the belt in the case of a percentage of synthetic fibers beyond the indicated range.

The improved fabric of the present invention providing the coefficient of thermal contraction of less than 1% and more than 60% in bias elongation to break provides a reinforcing of the belt substantially improved over that of the prior art fabrics. The fabrics have sufficient adhesive strength to prevent peeling from the rubber laminate layers and, thus, a substantially improved belt manufacture results.

Figure 2:
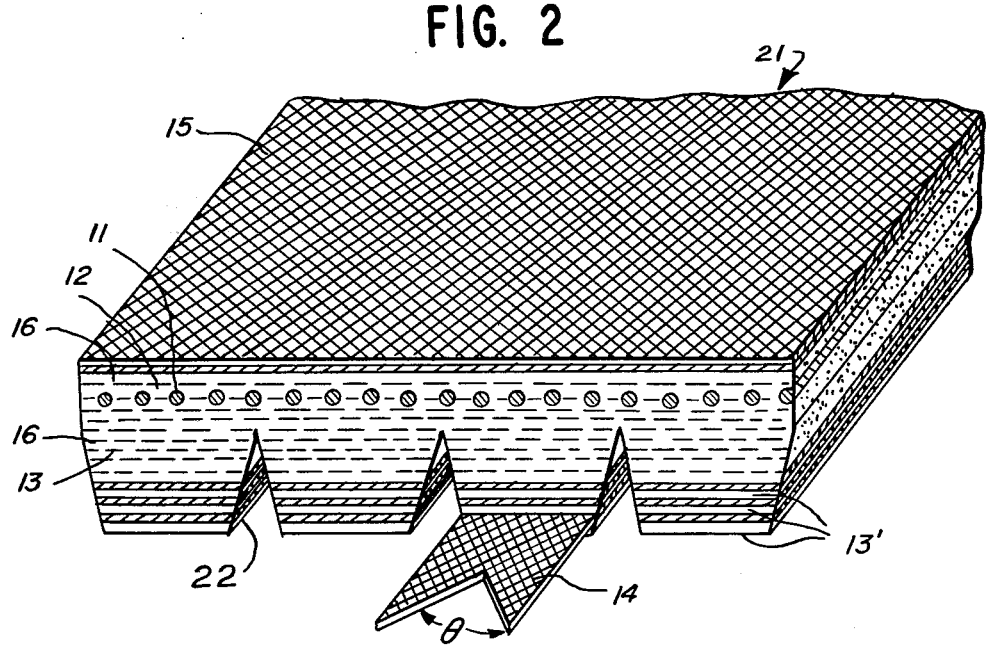
FIG. 2 is a fragmentary perspective sectional view of another form of belt manufacture embodying the invention.

Referring to the embodiment of FIG. 2, a multiribbed belt generally designated 21 is shown to comprise a belt generally similar to V-belt 10, but having a greater transverse extent so as to permit the provision of a plurality of outwardly narrowing notches, or grooves, 22 through the inner portion of the compression section 13 defined by the fabric layers 14 and rubber layers 13'. The notches, as shown in FIG. 2, may extend at least partially through the compression section 13, which, as illustrated, may be provided as in V-belt 10 with transversely extending discrete fibers 16.

As further shown in FIG. 2, the tension section 12 may similarly be provided with transverse discrete fibers 16 and the outer surface of the tension section may be provided with one or more layers of cover fabric 15 similar to the cover fabric 5 of belt 10. The tensile cords 11 are disposed intermediate the compression and tension sections, as in belt 10.

The manufacture of belt 21 is identical to the manufacture of belt 10, with the additional step of the provision of the notches 22 being carried out in the manufacture thereof. The fabric layers 14 are formed in the same manner as the fabric layers 4 of belt 10 and provide effectively similar improved characteristics in the multiribbed belt 21.

Thus, the invention comprehends the provision of an improved power transmission belt which may be a raw edge V-belt or multiribbed belt wherein a unique fabric layer is provided in the inner portion of the compression section. The fabric has a low coefficient of thermal contraction while being formed in part of synthetic resin fibers. The fabric further has high elasticity and flexibility in the longitudinal direction of the belt to provide substantially extended useful life thereof.

The fabric fibers effectively minimize breakage as by subjection of the raw edge belts to road water and the like. The fabrics have improved adhesive bonds with the rubber layers of the belt effectively preventing peeling between the fabric layers and rubber layers.

The fabrics cooperate with the transverse short fibers, providing an improved resistance to lateral pressures in the use of the belt. The rubber layers between the fabric layers provide improved cushioning for further extending the useful life of the belt.

The foregoing disclosure of specific embodiments is illustrative of the broad inventive concepts comprehended by the invention.

We claim:

1. In a power transmission belt having an inner compression section, an outer tension section, and longitudinal tensile cords intermediate said compression and tension sections, the improvement comprising
at least one layer of low thermal contraction fabric forming an inner portion of the compression section, said fabric being comprised of yarns formed of a mixture of natural and synthetic fibers in the ratio of approximately 30% to 70%, said yarns having a coefficient of thermal contraction of no more than approximately 1% and a bias elongation to break of greater than 60%.

2. The power transmission belt of claim 1 wherein said natural fibers comprise cotton.

3. The power transmission belt of claim 1 wherein said synthetic fibers comprise nylon fibers.

4. The power transmission belt of claim 1 wherein said synthetic fibers comprise polyester resin fibers.

5. The power transmission belt of claim 1 wherein said natural and synthetic fibers are blended in said yarns.

6. The power transmission belt of claim 1 wherein said natural and synthetic fibers are twist-mixed in said yarns.

7. The power transmission belt of claim 1 wherein said fabric is a plain weave fabric.

8. The power transmission belt of claim 1 wherein said fabric is bias laid in said layer.

9. The power transmission belt of claim 1 wherein said fabric comprises a wide angle fabric wherein the warp and woof yarns are disposed at an angle to each other of approximately 95° to 150°.

10. The power transmission belt of claim 1 wherein said fabric is rubber-coated.

11. The power transmission belt of claim 1 wherein said compression section is provided with short transverse reinforcing fibers intermediate said tensile cords and said layer.

12. The power transmission belt of claim 1 wherein said tension section is provided with short transverse reinforcing fibers.

13. The power transmission belt of claim 1 wherein said tension section is provided with at least one fabric layer at its outer surface.

14. The power transmission belt of claim 1 wherein said tensile section is provided with at least one stretchable fabric layer at its outer surface.

15. The power transmission belt of claim 1 wherein said compression section is provided with at least one longitudinal notch to define a multiribbed belt.

16. The power transmission belt of claim 1 wherein said belt defines a V-belt.

17. In a power transmission belt having an inner compression section, an outer tension section, and longitudinal tensile cords, the improvement comprising
at least one layer of low thermal contraction fabric forming an inner portion of the compression section, said fabric being comprised of yarns formed of a mixture of natural and synthetic fibers in the ratio of approximately 30% to 70%, said yarns having a coefficient of thermal contraction of no more than approximately 1%.

18. The power transmission belt of claim 17 wherein said natural fibers comprise cotton.

19. The power transmission belt of claim 17 wherein said synthetic fibers comprise nylon fibers.

20. The power transmission belt of claim 17 wherein said synthetic fibers comprise polyester resin fibers.

21. The power transmission belt of claim 17 wherein said natural and synthetic fibers are blended in said yarns.

22. The power transmission belt of claim 17 wherein said natural and synthetic fibers are twist-mixed in said yarns.

23. The power transmission belt of claim 17 wherein said fabric is a plain weave fabric.

24. The power transmission belt of claim 17 wherein said fabric is bias laid in said layer.

25. The power transmission belt of claim 17 wherein said fabric comprises a wide angle fabric wherein the warp and woof yarns are disposed at an angle to each other of approximately 95° to 150°.

26. The power transmission belt of claim 17 wherein said fabric is rubber-coated.

27. The power transmission belt of claim 17 wherein said compression section is provided with short transverse reinforcing fibers intermediate said tensile cords and said layer.

28. The power transmission belt of claim 17 wherein said tension section is provided with short transverse reinforcing fibers.

29. The power transmission belt of claim 17 wherein said tension section is provided with at least one fabric layer at its outer surface.

30. The power transmission belt of claim 17 wherein said tensile section is provided with at least one stretchable fabric layer at its outer surface.

31. The power transmission belt of claim 17 wherein said compression section is provided with at least one longitudinal notch to define a multiribbed belt.

32. The power transmission belt of claim 17 wherein said belt defines a V-belt.

* * * * *